United States Patent
Subramanian et al.

(10) Patent No.: US 11,828,226 B2
(45) Date of Patent: Nov. 28, 2023

(54) COMPRESSOR BLEED AIR CHANNELS HAVING A PATTERN OF VORTEX GENERATORS

(71) Applicant: General Electric Company, Schenectady, NY (US)

(72) Inventors: Sesha Subramanian, Bengaluru (IN); Ravikanth Avancha, Bengaluru (IN); Atanu Saha, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/827,180

(22) Filed: May 27, 2022

(65) Prior Publication Data
US 2023/0332539 A1    Oct. 19, 2023

(30) Foreign Application Priority Data

Apr. 13, 2022  (IN) .............................. 202211022128

(51) Int. Cl.
*F02C 6/08*  (2006.01)
*F02C 9/18*  (2006.01)

(52) U.S. Cl.
CPC . *F02C 6/08* (2013.01); *F02C 9/18* (2013.01)

(58) Field of Classification Search
CPC ...... F02C 6/08; F02C 9/18; F02C 3/13; F02K 3/02; F01D 25/12; F01D 25/14; F01D 25/24; F01D 25/26; F05D 2240/127
See application file for complete search history.

(56) References Cited

U.S. PATENT DOCUMENTS

| | | | | | |
|---|---|---|---|---|---|
| 3,632,223 | A | * | 1/1972 | Hampton | F04D 29/522 415/199.5 |
| 3,945,759 | A | * | 3/1976 | Bobo | F04D 29/545 415/145 |
| 4,236,870 | A | * | 12/1980 | Hucul, Jr. | F01D 5/20 415/115 |
| 4,844,689 | A | * | 7/1989 | Seed | F04D 27/023 415/169.1 |
| 5,058,837 | A | * | 10/1991 | Wheeler | B64C 23/06 244/200.1 |

(Continued)

FOREIGN PATENT DOCUMENTS

| | | |
|---|---|---|
| CN | 108757178 A | 11/2018 |
| FR | 3129432 A1 | 5/2023 |

(Continued)

*Primary Examiner* — William H Rodriguez
(74) *Attorney, Agent, or Firm* — HANLEY, FLIGHT & ZIMMERMAN, LLC

(57) ABSTRACT

In one aspect, the present disclosure is directed a gas turbine engine including a compressor, a combustor, and a turbine in a serial flow arrangement. The compressor includes a casing having an inner wall and an outer wall. The inner wall defines a passageway for airflow through the compressor. The casing defines a bleed cavity between the inner wall and the outer wall. The inner wall has an opening. The casing defining a channel between the opening and the bleed cavity to direct airflow into the bleed cavity. The channel is defined by a first wall and a second wall of the casing. The second wall being downstream of the first wall. A surface of the first wall has a pattern to reduce flow separation in the channel.

16 Claims, 6 Drawing Sheets

(56) References Cited

U.S. PATENT DOCUMENTS

| | | | | |
|---|---|---|---|---|
| 5,059,093 | A * | 10/1991 | Khalid | F04D 29/522 415/115 |
| 5,155,993 | A * | 10/1992 | Baughman | F04D 27/0223 60/226.1 |
| 5,156,362 | A | 10/1992 | Leon | |
| 6,109,868 | A * | 8/2000 | Bulman | F04D 27/023 415/185 |
| 6,325,595 | B1 * | 12/2001 | Breeze-Stringfellow | F01D 17/10 415/144 |
| 6,438,941 | B1 * | 8/2002 | Elliott | F02C 9/18 60/785 |
| 6,732,530 | B2 * | 5/2004 | Laurello | F04D 29/584 60/785 |
| 6,783,324 | B2 * | 8/2004 | Muny | F04D 27/023 415/173.1 |
| 8,388,308 | B2 * | 3/2013 | Karafillis | F01D 17/105 415/169.1 |
| 8,935,926 | B2 * | 1/2015 | Wagner | F04D 29/4206 60/785 |
| 9,163,521 | B2 | 10/2015 | Roberts, II et al. | |
| 9,677,472 | B2 * | 6/2017 | Travis | F02C 6/08 |
| 9,726,197 | B2 * | 8/2017 | Boniface | F04D 29/681 |
| 10,125,781 | B2 * | 11/2018 | Klasing | F04D 27/009 |
| 10,302,019 | B2 * | 5/2019 | Thomas, Jr. | F02C 9/18 |
| 10,539,153 | B2 * | 1/2020 | Thomas | F02C 9/18 |
| 10,774,750 | B2 * | 9/2020 | Walker | F01D 25/24 |
| 10,934,943 | B2 * | 3/2021 | Taylor | F04D 29/547 |
| 11,441,438 | B2 * | 9/2022 | Becker | F04D 27/0215 |
| 11,512,611 | B2 * | 11/2022 | Taylor | F01D 9/044 |
| 2004/0079082 | A1 * | 4/2004 | Bunker | F23M 5/00 60/752 |
| 2006/0042255 | A1 * | 3/2006 | Bunker | F02C 7/18 60/752 |
| 2007/0137175 | A1 * | 6/2007 | Moniz | F01D 17/105 60/785 |
| 2010/0209257 | A1 * | 8/2010 | Fuglsang | F03D 1/0675 416/223 R |
| 2010/0223931 | A1 * | 9/2010 | Chila | F23R 3/46 60/760 |
| 2011/0095135 | A1 * | 4/2011 | Miller | B64C 23/06 244/200.1 |
| 2011/0214428 | A1 * | 9/2011 | Shershnyov | F23R 3/06 60/754 |
| 2011/0239654 | A1 * | 10/2011 | Bland | F23R 3/002 60/752 |
| 2013/0129520 | A1 * | 5/2013 | Enevoldsen | F03D 1/0608 416/235 |
| 2014/0096536 | A1 * | 4/2014 | Travis | F02C 9/18 60/785 |
| 2014/0109589 | A1 * | 4/2014 | Pritchard, Jr. | F02C 6/08 60/785 |
| 2015/0010407 | A1 * | 1/2015 | Zamora Rodriguez | F03D 1/0641 416/236 R |
| 2015/0192319 | A1 * | 7/2015 | Song | F24F 1/0029 454/284 |
| 2016/0123236 | A1 * | 5/2016 | Walker | F01D 9/06 415/144 |
| 2017/0108006 | A1 * | 4/2017 | Wilshaw | F02C 6/08 |
| 2018/0100440 | A1 * | 4/2018 | Moniz | F02C 6/08 |
| 2018/0202360 | A1 * | 7/2018 | Mukhopadhyay | F01D 25/24 |
| 2018/0266439 | A1 * | 9/2018 | Thomas | F04D 29/522 |
| 2018/0313276 | A1 * | 11/2018 | Taylor | F02C 6/08 |
| 2018/0313364 | A1 * | 11/2018 | Moeckel | F02C 6/08 |
| 2018/0355884 | A1 * | 12/2018 | Sakoda | F04D 29/325 |
| 2019/0078516 | A1 * | 3/2019 | Sampath | F02C 7/185 |
| 2019/0249875 | A1 * | 8/2019 | Gandikota | F23R 3/06 |
| 2020/0166048 | A1 * | 5/2020 | Teramoto | F04D 29/681 |
| 2020/0200388 | A1 | 6/2020 | Garner et al. | |
| 2022/0018293 | A1 * | 1/2022 | Taylor | F02C 9/18 |
| 2022/0251968 | A1 * | 8/2022 | Taylor | B33Y 80/00 |
| 2023/0044297 | A1 * | 2/2023 | Taylor | F04D 29/023 |

FOREIGN PATENT DOCUMENTS

| | | |
|---|---|---|
| KR | 102042975 B1 | 11/2019 |
| WO | 2016151267 A1 | 9/2016 |

* cited by examiner

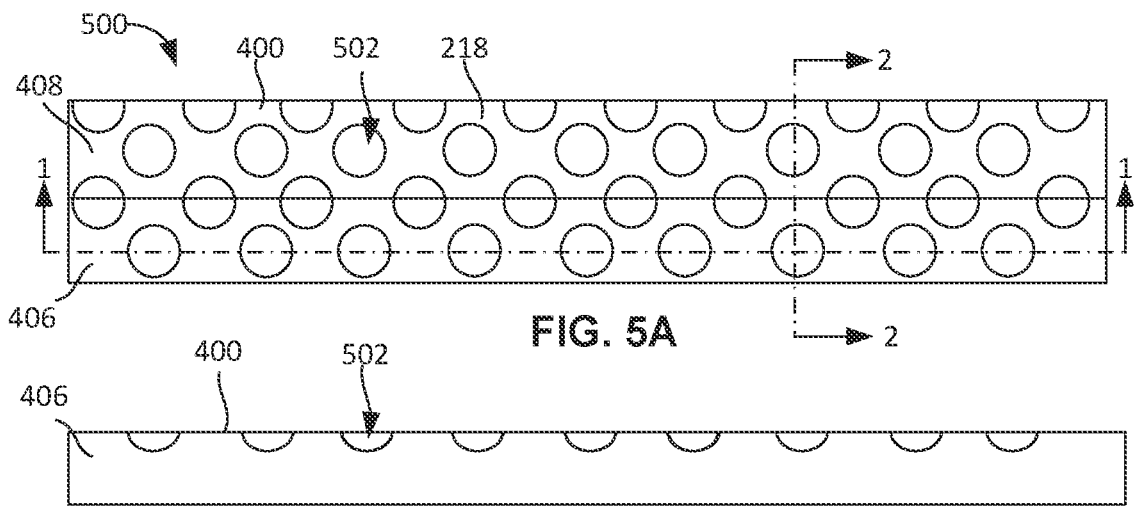
FIG. 5A
FIG. 5B
FIG. 5C
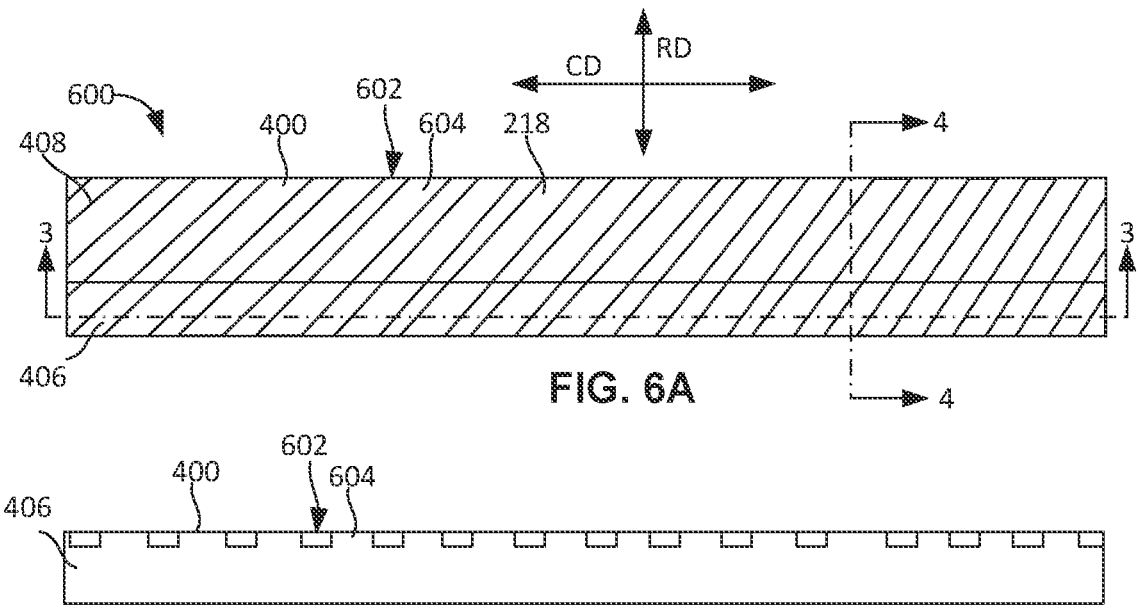
FIG. 6A
FIG. 6B
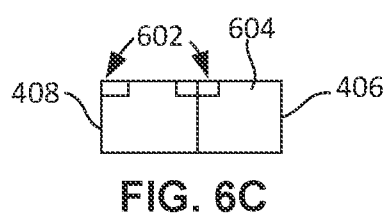
FIG. 6C

COMPRESSOR BLEED AIR CHANNELS HAVING A PATTERN OF VORTEX GENERATORS

RELATED APPLICATION

This patent claims priority to Indian Patent Application No. 202211022128, titled "Compressor Bleed Air Channels Having a Pattern of Vortex Generators," filed Apr. 13, 2022, which is hereby incorporated by this reference in its entirety.

FIELD OF THE DISCLOSURE

The present disclosure relates generally to turbofan engines and, more particularly, to compressor bleed air channels in gas turbine engines.

BACKGROUND

Turbofan engines, such as those used on aircraft, generally include a fan, a gas turbine engine to drive the fan, and an outer bypass duct. The gas turbine engine includes compressor section, a combustor, and a turbine section in a serial flow arrangement. Some gas turbine engines extract high pressure air from the compressor section, known as "bleed air." This bleed air can be used to provide cooling to one or more parts of the engine and/or power one or more systems of the aircraft.

BRIEF DESCRIPTION OF THE DRAWINGS

A full and enabling disclosure of the presently described technology, including the best mode thereof, directed to one of ordinary skill in the art, is set forth in the specification, which makes reference to the appended Figs., in which:

FIG. 5A is a first example of a pattern of vortex generators that can be implemented in connection with the example bleed channel of FIG. 4;

FIG. 5B is a cross-sectional view of the pattern of vortex generators taken along line 1-1 of FIG. 5A;

FIG. 5C is a cross-sectional view of the pattern of vortex generators taken along line 2-2 of FIG. 5A;

FIG. 6A is a second example of a pattern of vortex generators that can be implemented in connection with the example bleed channel of FIG. 4;

FIG. 6B is a cross-sectional view of the pattern of vortex generators taken along line 3-3 of FIG. 6A;

FIG. 6C is a cross-sectional view of the pattern of vortex generators taken along line 4-4 of FIG. 6A;

Figure 1:
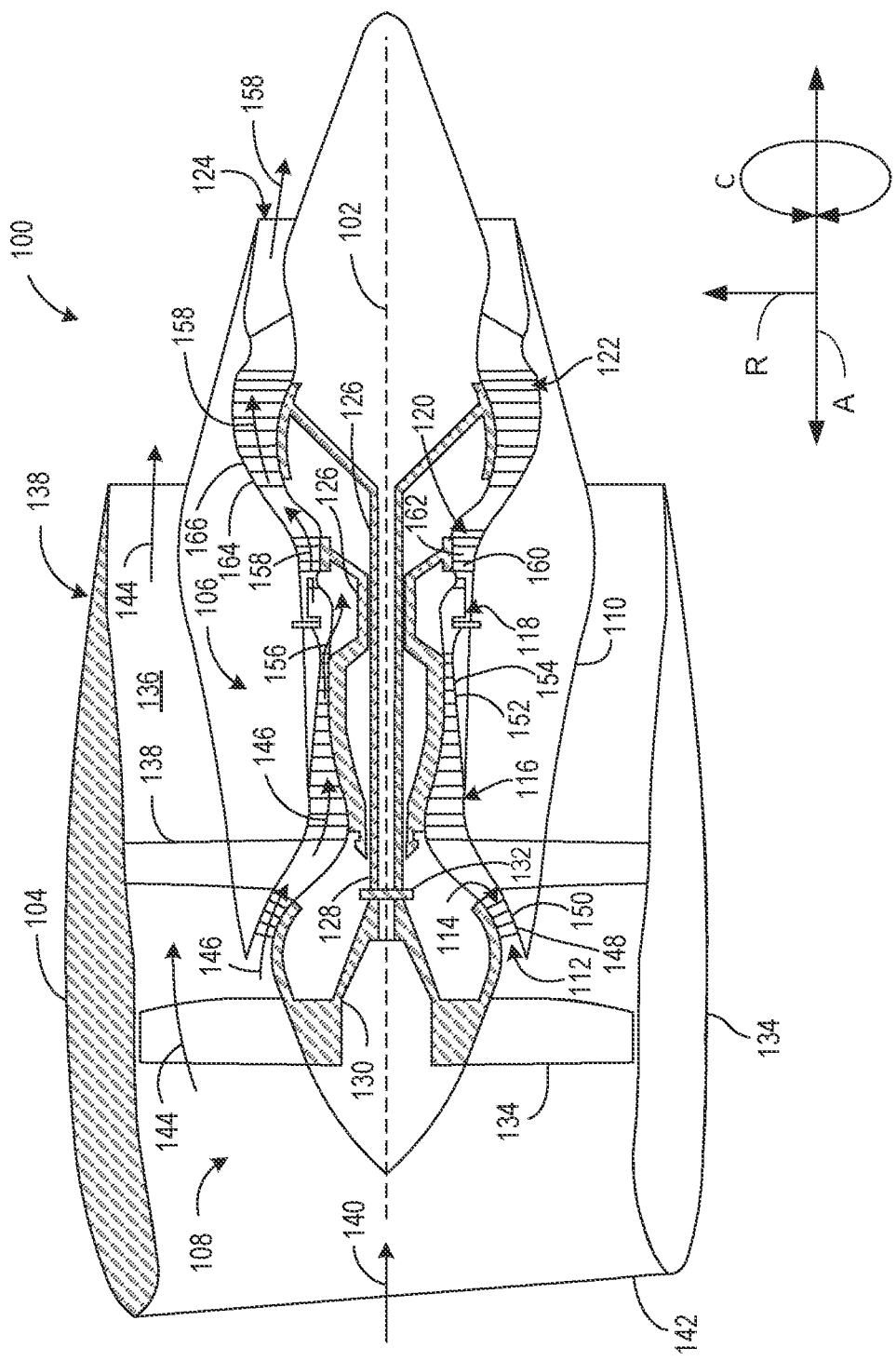
FIG. 1 is a schematic cross-sectional view of an example turbofan engine in accordance with the examples disclosed herein.

Repeat use of reference characters in the present specification and drawings is intended to represent the same or analogous features or elements of the present disclosure.

DETAILED DESCRIPTION

Reference now will be made in detail to embodiments or examples of the presently described technology, one or more examples of which are illustrated in the drawings. Each example is provided by way of explanation of the presently described technology, not limitation of the presently described technology. In fact, it will be apparent to those skilled in the art that various modifications and variations can be made in the presently described technology without departing from the scope or spirit of the presently described technology. For instance, features illustrated or described as part of one embodiment or example can be used with another embodiment or example to yield a still further embodiment or example. Thus, it is intended that the presently described technology covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Disclosed herein are example vortex generators and example patterns of vortex generators that reduce (e.g., minimize) or limit flow separation that may occur in a bleed air channel of a gas turbine engine. Turbofan engines, such as those used on aircraft, include a gas turbine engine. A gas turbine engine includes a compressor, a combustor, and a turbine in a serial flow arrangement. Often, the gas turbine engine is designed to extract some of the high-pressure air from the compressor. This extracted air is typically referred to as "bleed air." Bleed air can be used for various purposes in the gas turbine engine and/or the aircraft. For example, in some instances, bleed air is used for cooling other parts of the engine, such as the turbine. Additionally or alternatively, bleed air can be used as a high-pressure air source for one or more systems of the aircraft and/or to power one or more systems of the aircraft, such as an environmental control system (ECS), a wing anti-icing system, and/or an engine anti-icing system.

To extract this bleed air from the compressor, a casing of the compressor has an opening (sometimes referred as a bleed slot). The opening is connected by a bleed channel to a bleed cavity (e.g., a plenum, a chamber, etc.). High pressure air from the compressor flows into the opening and through the bleed channel to fill the bleed cavity. One or more hose or tubes are connected to the casing at the bleed cavity to distribute the bleed air in the bleed cavity to one or more downstream locations or systems where the bleed air is used. The bleed channel is formed by a first wall and a second wall of the casing. The second wall is downstream of the first wall, or, said another way, the first wall is upstream of the second wall. Therefore, the first and second walls may also be referred to as upstream and downstream walls, respectively. While in some conditions the bleed air may flow smoothly through the bleed channel, in other conditions, such as during nominal bleed conditions, flow separation occurs along the first wall. This causes recirculation bubbles in the bleed channel, which reduces or limits bleed air pressure recovery and pressure in the bleed cavity. Bleed air pressure recovery is the percentage of dynamic pressure (difference between total and static pressure) that gets recovered. Bleed cavity pressure is the static pressure plus the recovered dynamic pressure. Therefore, it is typically desired to increase or improve pressure recovery, which equates to more bleed cavity pressure and therefore more pressure margin for use in the cooling systems.

Disclosed herein are examples in which one or more vortex generators are on (e.g., formed on) a surface of the first wall. The vortex generators create vortexes and/or turbulence (e.g., disturbances) in the airflow along the surface of the first wall. The vortexes and/or turbulences essentially energize or impart momentum into the area along the surface of the first wall, which reduces (e.g., minimizes, delays, etc.) the flow separation along the first wall. As a result, the bleed air has a smoother, more laminar flow through the bleed channel and into the bleed cavity. This significantly improves the bleed air pressure recovery and the pressure capacity in the bleed cavity, especially during certain conditions like nominal bleed conditions.

In some examples, the one or more vortex generators are formed as a pattern of vortex generators on the surface of the first wall. For example, the surface of the first wall may be patterned with a pattern (e.g., surface treatment, protrusions, recesses, etc.). The features (e.g., protrusions, recesses, etc.) of the patterns correspond to the vortex generators. In some examples, the pattern of the vortex generators is implemented as recesses extending into the surface of the first wall or it can be implemented as protrusions extending outward from the surface of the first wall. In a first example, the recesses are hemispherical-shaped recesses. Additionally or alternatively, the hemispherical-shaped features can be implemented as protrusions extending outside the first wall. In a second example, the recesses are slots that are spaced apart and parallel to each other. In some examples, the slots are angled relative to a radial direction and a circumferential direction of the gas turbine engine. In a third example, the slots are aligned with or parallel to the circumferential direction of the gas turbine engine. In other examples disclosed herein, the pattern of vortex generators can be implemented as protrusions extending from the surface of the first wall. For instance, in a fourth example, the protrusions are airfoil shaped protrusions. In some examples, the pattern of vortex generators are formed (e.g., machined, stamped, embossed) directly on the surface of the first wall. In other examples, a sheet or panel having the pattern of vortex generators is coupled to the first wall.

Referring now to the drawings, wherein identical numerals indicate the same elements throughout the figures, FIG. 1 is a schematic cross-sectional view of an example high-bypass turbofan-type gas turbine engine 100 ("turbofan engine 100") that can incorporate various examples disclosed herein. While the illustrated example is a high-bypass turbofan engine, the principles of the present disclosure are also applicable to other types of engines, such as low-bypass turbofans, turbojets, turboprops, etc.

As shown in FIG. 1, the turbofan engine 100 includes an outer bypass duct 104 (which may also be referred to as a nacelle, fan duct, or outer casing), a gas turbine engine 106 (which may also be referred to as a core turbine engine or turbo-machinery), and a fan section 108. The gas turbine engine 106 and the fan section 108 are disposed at least partially in the outer bypass duct 104. The gas turbine engine 106 is disposed downstream from the fan section 108 and drives the fan section 108 to produce forward thrust. As shown in FIG. 1, the turbofan engine 100 and/or the gas turbine engine 106 define a longitudinal or axial centerline axis 102 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 102, the radial direction R is a direction that extends orthogonally outwardly from the centerline axis 102, and the circumferential direction C is a direction that extends concentrically around the centerline axis 102.

The gas turbine engine 106 includes a substantially tubular outer casing 110 (which may also be referred to as a mid-casing) that defines an annular inlet 112. The outer casing 110 of the gas turbine engine 106 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124. A high pressure shaft or spool 126 ("HP shaft 126") drivingly couples the HP turbine 120 and the HP compressor 116. A low pressure shaft or spool 128 ("LP shaft 128") drivingly couples the LP turbine 122 and the LP compressor 114. The LP shaft 128 may also couple to a fan spool or shaft 130 of the fan section 108. In some examples, the LP shaft 128 may couple directly to the fan shaft 130 (i.e., a direct-drive configuration). In alternative configurations, the LP shaft 128 may couple to the fan shaft 130 via a reduction gearbox 132 (i.e., an indirect-drive or geared-drive configuration).

As shown in FIG. 1, the fan section 108 includes a plurality of fan blades 134 coupled to and extending radially outwardly from the fan shaft 130. The outer bypass duct 104 circumferentially encloses the fan section 108 and/or at least a portion of the gas turbine engine 106. In particular, the gas turbine engine is disposed in the outer bypass duct 104 such that a bypass airflow passage or duct 136 is formed between the outer casing 110 of the gas turbine engine 106 and the outer bypass duct 104. The outer bypass duct 104 may be supported relative to the gas turbine engine 106 by a plurality of circumferentially-spaced apart outlet guide vanes 138.

As illustrated in FIG. 1, during operation of the turbofan engine 100, air 140 enters an inlet portion 142 of the turbofan engine 100. The air 140 is accelerated by the fan blades 134. A first portion 144 of the air 140 flows into the bypass airflow passage 136, while a second portion 146 of the air 140 flows into the inlet 112 of the gas turbine engine 106 (and, thus, into the LP compressor 114). One or more sequential stages of LP compressor stator vanes 148 and LP compressor rotor blades 150 coupled to the LP shaft 128 progressively compress the second portion 146 of the air 140 flowing through the LP compressor 114 en route to the HP compressor 116. Next, one or more sequential stages of HP compressor stator vanes 152 and HP compressor rotor blades 154 coupled to the HP shaft 126 further compress the second portion 146 of the air 140 flowing through the HP compressor 116. This provides compressed air 156 to the combustion section 118 where it mixes with fuel and burns to provide combustion gases 158.

The combustion gases 158 flow through the HP turbine 120 where one or more sequential stages of HP turbine stator vanes 160 and HP turbine rotor blades 162 coupled to the HP shaft 126 extract a first portion of kinetic and/or thermal energy therefrom. This energy extraction supports operation of the HP compressor 116. The combustion gases 158 then flow through the LP turbine 122 where one or more sequential stages of LP turbine stator vanes 164 and LP turbine rotor blades 166 coupled to the LP shaft 128 extract a second portion of thermal and/or kinetic energy therefrom. This energy extraction causes the LP shaft 128 to rotate, thereby supporting operation of the LP compressor 114 and/or rotation of the fan shaft 130. The combustion gases 158 then exit the gas turbine engine 106 through the exhaust section 124 thereof. The combustion gases 158 mix with the first portion 144 of the air 140 from the bypass airflow passage 136 to produce propulsive thrust.

Along with the turbofan engine 100, the gas turbine engine 106 serves a similar purpose and sees a similar environment in land-based gas turbines, turbojet engines in which the ratio of the first portion 144 of the air 140 to the second portion 146 of the air 140 is less than that of a turbofan, and unducted fan engines in which the fan section 108 is devoid of the outer bypass duct 104. In each of the turbofan, turbojet, and unducted engines, a speed reduction device (e.g., the reduction gearbox 132) may be included between any shafts and spools. For example, the reduction gearbox 132 may be disposed between the LP shaft 128 and the fan shaft 130 of the fan section 108.

Figure 2:
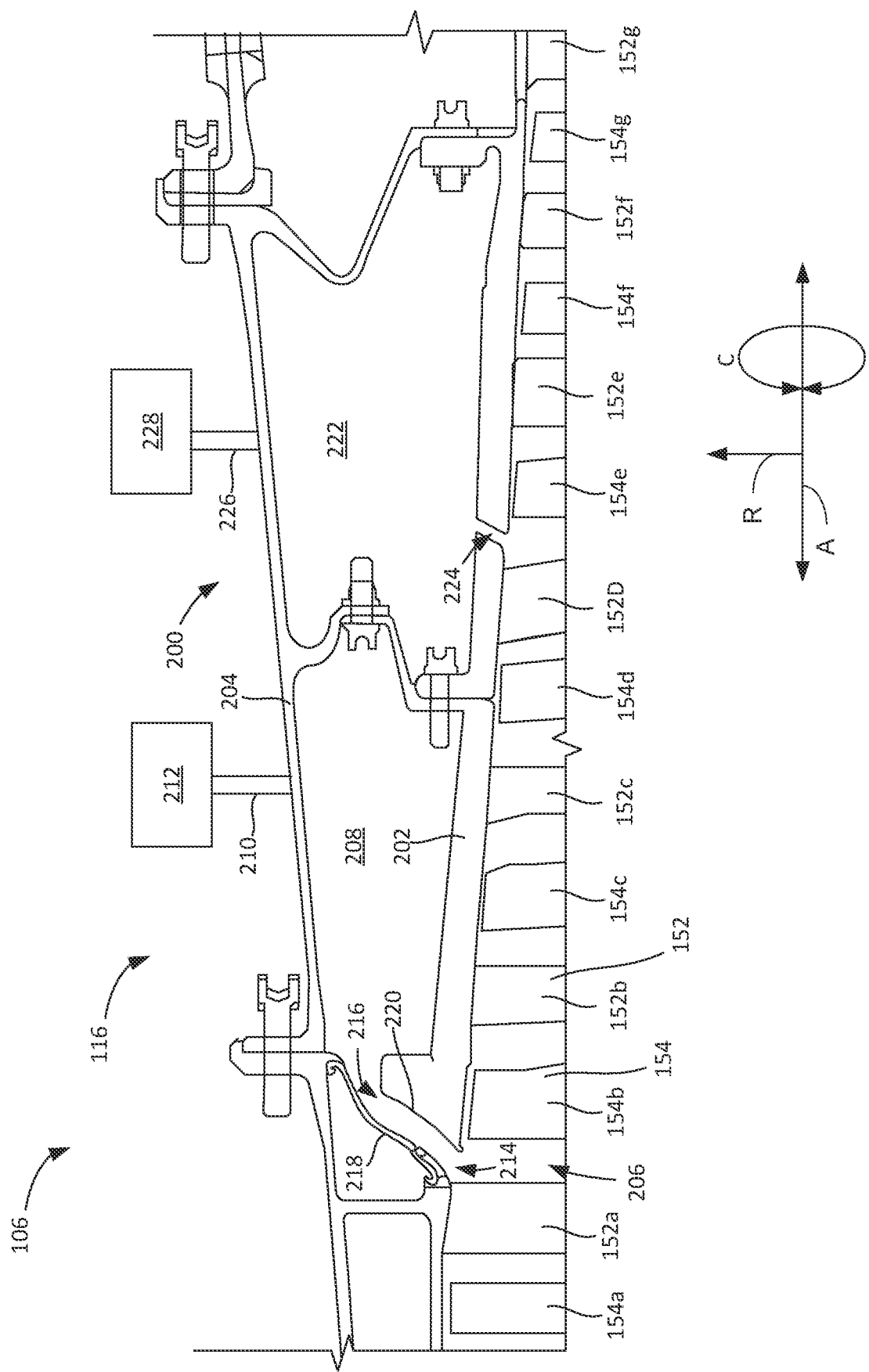
FIG. 2 is an enlarged cross-sectional view of a portion of an example compressor of an example gas turbine engine of the example turbofan engine of FIG. 1.

FIG. 2 is an enlarged cross-sectional view of a portion of the HP compressor 116 of the gas turbine engine 106 of the turbofan engine 100 from FIG. 1. The HP compressor 116 of the gas turbine engine 106 includes a casing 200. The casing 200 can correspond to the outer casing 110 (FIG. 1) or a portion of the outer casing 110. The casing 200 has an inner wall 202 and an outer wall 204 (which may be coupled by one or more walls or sections of the casing 200). In some examples, the inner and outer walls 202, 204 are spaced apart such that one or more cavities or chambers are formed between the inner and outer walls 202, 204, disclosed in further detail herein. The inner wall 202 defines, forms, and/or otherwise surrounds a passageway 206 for airflow through the HP compressor 116 to the combustion section 118 (the combustor). The stator vanes 152 (one of which is referenced in FIG. 2) are coupled to and extend radially inward from the inner wall 202. The rotor vanes 154 (one of which is referenced in FIG. 2) are coupled to and extend radially outward from the HP shaft 126 (FIG. 1) and are disposed between rows of the stator vanes 152. In particular, rows of stator vanes 152 are labeled 152a-152g, and rows of the rotor vanes 154 are labeled 154a-154g. There are multiple stator vanes 152 in each of the rows 152a-f, and multiple rotor vanes 154 arranged in each of the rows 154a-154g. The HP compressor 116 can include any number of rows of stator vanes or rotor vanes. In some examples, each row 152a-152g of stator vanes 152 and each row 154a-154g of rotor vanes 154 form a compression section or stage. For example, the rows 152a and 154a form one stage of the HP compressor 116. The HP compressor 116 may include multiple stages that progressively increase the pressure of the air flowing through the HP compressor 116 toward the combustion section 118 (FIG. 1).

In some examples, the walls of the casing 200 define one or more openings or slots to extract high-pressure air from the passageway 206 of the HP compressor 116. This high-pressure air is referred to as "bleed air" because it is "bled" from the HP compressor 116. Bleed air is used for various purposes in the turbofan engine 100 and/or the aircraft. For example, bleed air can be used to cool or reduce the temperature the turbine(s) of the gas turbine engine 106. Additionally or alternatively, the bleed air can be used to pressurize certain seals in the gas turbine engine 106, which helps maintain tighter fittings and tolerances. Further, if the turbofan engine 100 is used on an aircraft, the bleed air can be used to power and/or provide a constant supply of air for one or more systems, such as an environmental control system (ECS) (which provides pressurized and temperature-controlled air to the cabin), a wing anti-icing system, and/or an engine anti-icing system.

In the illustrated example of FIG. 2, the casing 200 defines a bleed cavity 208 (e.g., a plenum, a collection chamber) between the inner wall 202 and the outer wall 204. Bleed air is extracted from the passageway 206 and fills the bleed cavity 208. One or more hoses or fluid lines 210 are coupled to the outer wall 204 of the casing 200 and route (e.g., distribute) the bleed air to one or more downstream locations and/or systems 212. The downstream locations and/or systems 212 can include the HP turbine(s) 120, 122 (e.g., for cooling), an ECS, a wing anti-icing system, an engine anti-icing system, and/or any other location and/or system.

To supply the bleed cavity 208 with bleed air, the inner wall 202 of the casing 200 has an opening 214. The opening 214 is an annular slot around the inner wall 202. As shown in FIG. 2, the casing 200 defines or forms a passageway or channel 216 (which may be referred to as a bleed channel) between the opening 214 and the bleed cavity 208 to direct a portion of the airflow into the bleed cavity 208. In particular, during operation of the gas turbine engine 106, a portion of the airflow (e.g., high-pressure air) in the passageway 206 flows through into the opening 214 and through the channel 216 and fills the bleed cavity 208. In the illustrated example of FIG. 2, the channel 216 is defined between two walls of the casing 200. In particular, the channel 216 is defined by a first wall 218 of the casing 200 and a second wall 220 of the casing 200. The second wall 220 is downstream of the first wall 218, and the first wall 218 is upstream of the second wall 220. Therefore, in some examples, the first and second walls 218, 220 may also be referred to as upstream and downstream walls, respectively. The first wall 218 and/or the second wall 220 can be formed by one or multiple walls or sections of structures. As can be seen in FIG. 2, the channel 216 is angled or slanted in the downstream direction (e.g., from left to right in FIG. 2). This enables the bleed air to flow efficiently (in the generally downstream direction) into the bleed cavity 208.

In some examples, the gas turbine engine 100 can include one or more additional bleed cavities. For example, as shown in FIG. 2, the casing 200 defines another bleed cavity 222 (a second bleed cavity) that is filled with bleed air extracted from the HP compressor 116. The casing 200 defines a channel 224 (a second channel) that directs a portion of the airflow in the passageway 206 into the bleed cavity 222. One or more hoses or lines 226 connect the bleed cavity 222 to one or more downstream locations and/or systems 228. In some examples, the bleed cavities 208, 222 are filled with bleed air from different stages of the HP compressor 116. For example, the bleed cavity 208 may receive pressurized air from a fourth stage of the HP compressor 116, and the bleed cavity 222 may receive pressurized air from a seventh stage of the HP compressor 116. As such, the bleed air in the bleed cavity 222 is a higher pressure than the bleed air in the bleed cavity 208. For example, the bleed air in the bleed cavity 208 may be about 160 PSI, while the bleed air in the bleed cavity 222 may be about 350 PSI. In some examples, the bleed cavities 208, 222 are used to supply bleed air to different downstream locations and/or systems. For example, the bleed cavity 208 (with lower pressurized bleed air) may supply bleed air for cooling the LP turbine 122 (FIG. 1) and/or to an ECS, while the bleed cavity 222 (with higher pressurized bleed air) may supply bleed air for cooling the HP turbine 120 (FIG. 1). In other examples, the gas turbine engine 100 can include more or fewer bleed cavities and/or extract bleed air from other stages of the HP compressor 116. Example vortex generators and patterns of vortex generators disclosed herein are described in connection with the channel 216. However, it is understood that any of the examples disclosed herein can be likewise implemented in connection with the channel 224.

Figure 3B:
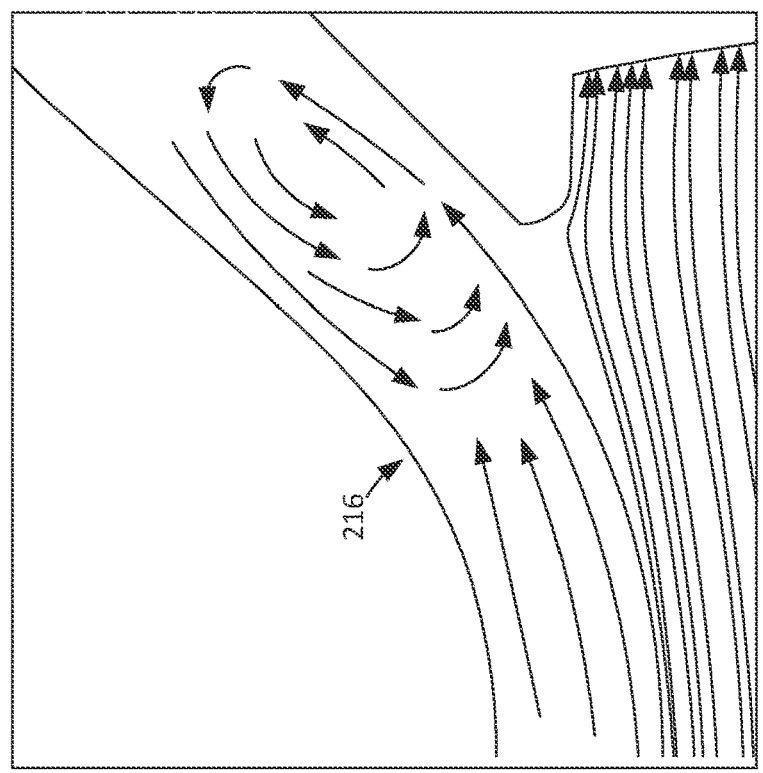
FIGS. 3A and 3B show example flow streams through an example bleed channel of the example compressor of FIG. 2 during different bleed conditions.
Figure 3A:
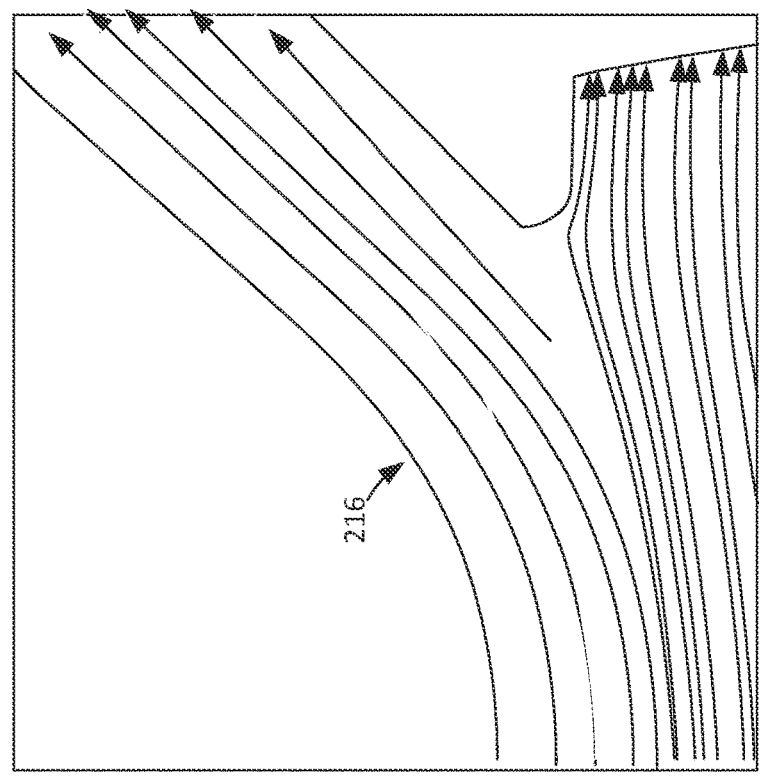

In some examples, the flow of air into the bleed cavity 208 and the pressure in the bleed cavity 208 depends on the demand from the downstream locations and/or systems 212. In some examples, an aircraft has two engines that provide bleed air to the downstream locations and/or systems 212. However, upon failure or deactivation of one of the engines, the demand for bleed air from one of the engines significantly increases. In some examples, the channel 216 is sized and shaped to produce laminar flow during these maximum bleed conditions (e.g., maximum demand times). However, during nominal (non-maximum) bleed conditions, flow separation commonly occurs along the first wall 218. For example, FIG. 3A shows a flow stream through the channel 216 during maximum demand conditions (e.g., during failure of one of the engines). As shown, the airflow through the channel 216 is relatively smooth and laminar. FIG. 3B shows the flow stream through the channel 216 during nominal bleed conditions, such as when both engines are providing bleed air. As shown, flow separation occurs in the channel 216. In particular, the flow stream detaches from the first wall 218, which creates recirculation bubbles in the channel 216. This limits or reduces the flow of bleed air into the bleed cavity 208. As such, this limits or reduces bleed air pressure recovery (e.g., the capacity of the bleed cavity 208 to receive bleed air) during nominal bleed conditions, which adversely affects the ability of the downstream locations and/or systems 212 to receive bleed air.

Figure 4:
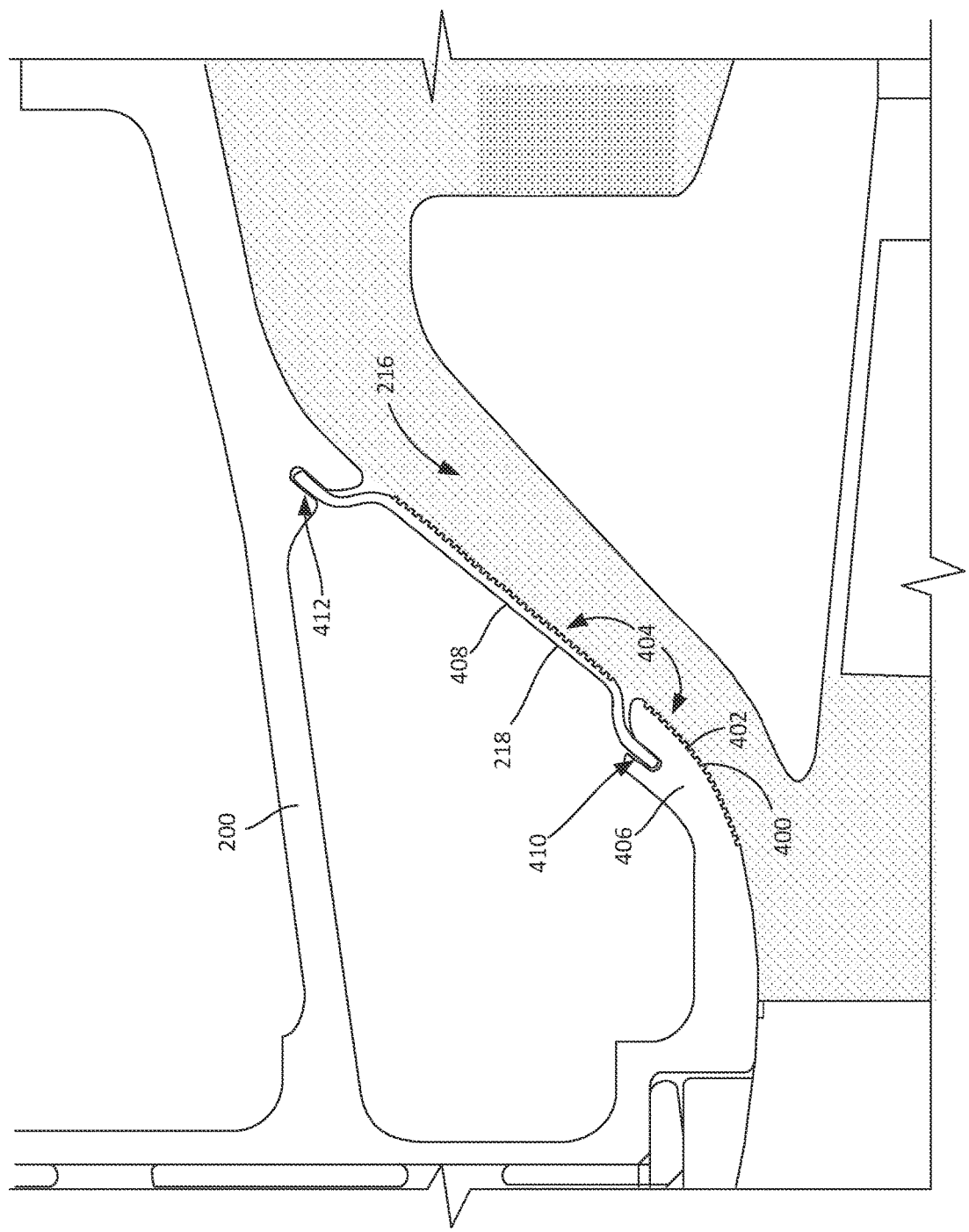
FIG. 4 is an enlarged view of an example bleed channel of FIG. 2 having an example pattern of vortex generators.

Disclosed herein are example features for improving the airflow through the channel 216. FIG. 4 is an enlarged view of the channel 216. In the illustrated example, a surface 400 of the first wall 218 has a plurality of vortex generators 402. In some examples, the surface 400 has a pattern 404 of the vortex generators 402. Said another way, the surface 400 of the first wall 404 is patterned with a pattern 404 of the vortex generators 402. The pattern 404 of the vortex generators 402 reduces flow separation in the channel 216. Examples of patterns of vortex generators are disclosed in further detail in conjunction with FIGS. 5A-8B.

In some examples, the vortex generators 402 include recesses extending into the surface 400 and/or protrusions extending outward from the surface 400. In some examples, the vortex generators 402 (e.g., recesses and/or protrusions) are formed directly on the surface 400. For example, the vortex generators 402 can be formed by embossing, stamping, machining, and/or other manufacturing techniques. In other examples, the vortex generators 402 can be separate parts or features that are coupled (e.g., welded, fastened, etc.) to the surface 400. In some examples, the vortex generators 402 are added to the surface 400 via an additive manufacturing process (sometimes referred to as 3D printing).

The vortex generators 402 create vortexes and/or turbulence along the surface 400 of the first wall 218. These vortexes and/or turbulence impart momentum into the area along the surface 400, which typically has relatively low velocity. By energizing this area, the airflow through the channel 216 remains closer to the surface 400 (i.e., reduces (e.g., minimizes) the size of the boundary layer) and, thus, reduces (e.g., delays) and/or limits the separation or detachment of the airflow from the surface 400 of the first wall 218. This results in a smoother, more laminar flow through the channel, similar to the flow stream shown in FIG. 3A. This improves airflow into the bleed cavity 208, which helps provide more air to the downstream locations and/or systems 212 during nominal bleed conditions. Further, because the pattern 404 of the vortex generators 402 is formed on the surface 400, the addition of the vortex generators 402 does not reduce or significantly affect the area of the channel 216.

In some examples, the casing 200 includes one or more portions (e.g., walls, structures, etc.) that form the first wall 218. For example, in FIG. 4, the first wall 218 is formed by a first casing portion 406 of the casing 200 and a second casing portion 408 of the casing 200 coupled to the first casing portion 406. In some examples, the first casing portion 406 is a machined or molded casing, and the second casing portion 408 is sheet metal. In the illustrated example, the first casing portion 406 has a first notch 410 and a second notch 412. The ends of the second casing portion 408 are disposed in the notches 410, 412, which couples the second casing portion 408 to the first casing portion 406. In other examples, the first and second casing portions 406, 408 can be coupled in other manners. In the illustrated example, the pattern 404 of the vortex generators 402 is formed on/along both the first casing portion 406 and the second casing portion 408. In some examples, the pattern 404 of the vortex generators 402 is formed via different techniques on the first and second casing portions 406, 408. For example, the pattern 404 of the vortex generators 402 on the surface 400 of the first casing portion 406 can be machined (e.g., drilled, etched, etc.), while the pattern 404 of the vortex generators 402 on the surface 400 of the second casing portion 408 can be stamped or embossed. In other examples, the pattern 404 may only be formed on one of the casing portions 406, 408. While in this example the first wall 218 is formed by two portions/structures, in other examples, the first wall 218 may be formed by a single structure. In other examples, the first wall 218 can be formed by more than two portions/structures. Further, in other examples, the pattern 404 of the vortex generators 402 may not be formed directly on the surface 400 of the first wall 218. Instead, a separate sheet or panel (e.g., sheet metal) having the pattern 404 of the vortex generators 402 can be coupled to the surface 400 of the first wall 218.

FIG. 5A shows a first exemplary pattern 500 of vortex generators 502 (one of which is referenced in FIG. 5A) that can be implemented as the pattern 404 of the vortex generators 402 in FIG. 4. FIG. 5A shows a portion of the first and second casing portions 406, 408 of the first wall 218. The example pattern 500 is referred to herein as a dimple pattern 500. The dimple pattern 500 is formed on the external surface 400 of the first and second casing portions 406, 408 of the first wall 218. In this example, the vortex generators 502 are recesses extending into (e.g., formed in) the surface 400 of the first wall 218. In some examples, the vortex generators 502 are spaced equidistant from each other. In this example, the vortex generators 502 are hemispherical-shaped recesses (which may also be referred to as dimples or scoops) extending into the surface 400. FIG. 5B is a cross-sectional view of the first casing portion 406 taken along line 1-1 of FIG. 5A. FIG. 5B shows the vortex generators 502 (e.g., the recesses) (one of which is referenced in FIG. 5B) formed in the surface 400 of the first casing portion 406. FIG. 5C is a cross-sectional view of the first and second casing portions 406, 408 taken along line 2-2 of FIG. 5A, showing the vortex generators 502. As the air flows along the surface 400, the vortex generators 502 generate vortexes and/or turbulence in the airflow, which reduces the boundary layer along the surface 400. Additionally or alternatively, one or more of the vortex generators 502 can protrude outward from the surface 400. For example, hemispherical-shaped protrusions (or other shaped protrusions) can be formed on the surface 400. Further, while in this example the vortex generators 502 are hemispherical-shaped recesses, in other examples, the recesses can be shaped differently, such as square-shaped, triangular-shaped, oval-shaped, etc.

FIG. 6A shows a second example pattern 600 of vortex generators that can be implemented as the pattern 404 of the vortex generators 402 in FIG. 4. FIG. 6A shows a portion of the first and second casing portions 406, 408 of the first wall 218. The example pattern 600 is referred to herein as an inclined slot pattern 600. The inclined slot pattern 600 is formed on the external surface 400 of the first and second casing portions 406, 408 of the first wall 218. In this example, the vortex generators includes slots 602 (e.g., recesses, grooves) (one of which is referenced in FIG. 6A) extending into (e.g., formed in) the surface 400 of the first wall 218. In the illustrated example of FIG. 6A, the slots 602 are parallel to and spaced apart from each other. In some examples, the slots 602 are spaced equidistant from each other. In the illustrated example, projecting ribs 604 (one of which is referenced in FIG. 6A) are formed between adjacent ones of the slots 602. The projecting ribs 604 may also be considered vortex generators. In this example, the slots 602 and the projecting ribs 604 are angled (i.e., not aligned) relative to the radial direction (R) and the circumferential direction (C) of the gas turbine engine 106 (FIG. 1). FIG. 6B is a cross-sectional view of the first casing portion 406 taken along line 3-3 of FIG. 6A. FIG. 6B shows the slots 602 (one of which is referenced in FIG. 6B) recessed into the surface 400 of the first casing portion 406 and the projecting ribs 604 (one of which is referenced in FIG. 6B). FIG. 6C is a cross-sectional view of the first and second casing portions 406, 408 taken along line 4-4 of FIG. 6A, showing the slots 602 and the projecting ribs 604. As the air flows along the surface 400, the vortex generators (e.g., slots 602 and the projecting ribs 604) generate vortexes and/or turbulence in the airflow, which reduces the boundary layer along the surface 400. While in this example the vortex generators are square or rectangle-shaped slots and ribs, in other examples, the slots and/or ribs can be shaped differently.

Figure 7A:
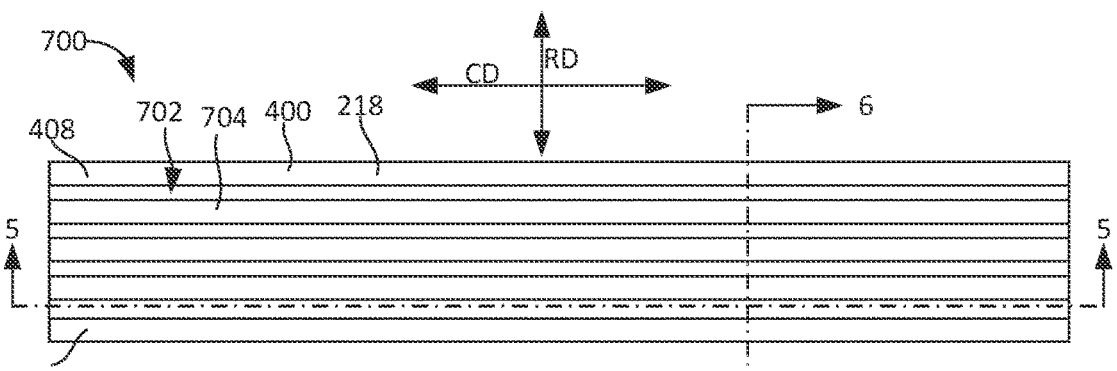
FIG. 7A is a third example of a pattern of vortex generators that can be implemented in connection with the example bleed channel of FIG. 4.
Figure 7B:
FIG. 7B is a cross-sectional view of the pattern of vortex generators taken along line 5-5 of FIG. 7A.
Figure 7C:
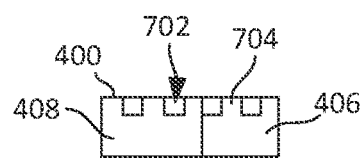
FIG. 7C is a cross-sectional view of the pattern of vortex generators taken along line 6-6 of FIG. 7A.

FIG. 7A shows a third example pattern 700 of vortex generators that can be implemented as the pattern 404 of the vortex generators 402 in FIG. 4. FIG. 7A shows a portion of the first and second casing portions 406, 408 of the first wall 218. The example pattern 700 is referred to herein as a horizontal slot pattern 700. The horizontal slot pattern 700 is formed on the external surface 400 of the first and second casing portions 404, 406. The vortex generators include slots 702 (one of which is referenced in FIG. 7A) recessed into the surface 400 and projecting ribs 704 (one of which is referenced in FIG. 7A) that are substantially the same as the vortex generators in FIGS. 6A-6C. However, in this example, the slots 702 and the projecting ribs 704 are parallel to or aligned in the circumferential direction (C) of the gas turbine engine 106 (FIG. 1). FIG. 7B is a cross-sectional view of the first casing portion 406 taken along line 5-5 of FIG. 7A, showing one of the example slots 702 and projecting ribs 704. FIG. 7C is a cross-sectional view of the first and second casing portions 406, 408 taken along line 6-6 of FIG. 7A, showing the slots 702 and the projecting ribs 704 (one of each is referenced in FIG. 7C). As the air flows along the surface 400, the vortex generators (e.g., the slots 702 and the projecting ribs 704) generate vortexes and/or turbulence in the airflow, which reduces the boundary layer along the surface 400. While in this example the vortex generators are square or rectangle-shaped slots and ribs, in other examples, the slots and/or ribs can be shaped differently.

Figure 8A:
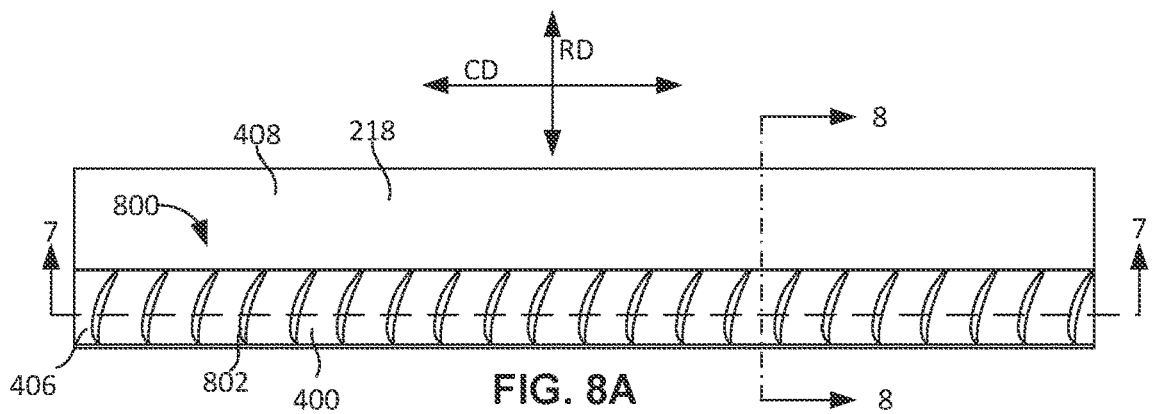
FIG. 8A is a fourth example of a pattern of vortex generators that can be implemented in connection with the example bleed channel of FIG. 4.
Figure 8B:
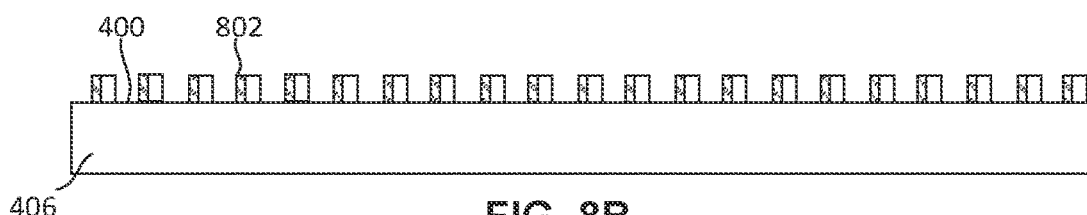
FIG. 8B is a cross-sectional view of the pattern of vortex generators taken along line 7-7 of FIG. 8A.
Figure 8C:
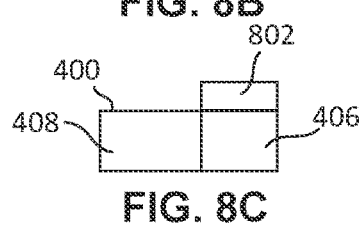
FIG. 8C is a cross-sectional view of the pattern of vortex generators taken along line 8-8 of FIG. 8A.

FIG. 8A shows a fourth example pattern 800 of vortex generators 802 (one of which is referenced in FIG. 8A) that can be implemented as the pattern 404 of the vortex generators 402 in FIG. 4. FIG. 8A shows a portion of the first and second casing portions 406, 408 of the first wall 218. The example pattern 800 is referred to herein as an airfoil pattern 800. In this example, the vortex generators 802 include protrusions extending from the surface 400 of the first wall 218. In particular, in this example, the vortex generators 802 are airfoil-shaped protrusions. In the illustrated example of FIG. 8A, the vortex generators 802 are arranged in a row in the circumferential direction (CD) of the gas turbine engine 106 (FIG. 1). In some examples, multiple rows of airfoil-shaped protrusions are included. In some examples, the vortex generators 802 are spaced equidistant from each other. In this example, the vortex generators 802 are only on the first casing portion 406 and are not on the second casing portion 408. However, in other examples, one or more vortex generators (e.g., airfoil shaped protrusions) can also be disposed on the second casing portion 408. FIG. 8B is a cross-sectional view of the first casing portion 406 taken along line 4-4 of FIG. 8A. FIG. 8B shows the vortex generators 802 (e.g., the airfoil-shaped protrusions) (one of which is referenced in FIG. 8B) extending from the surface 400. FIG. 8C is a cross-sectional view of the first and second casing portions 406, 408 taken along line 8-8 of FIG. 8A, showing one of the vortex generators 802. As the air flows along the surface 400, the vortex generators 802 generate vortexes and/or turbulence in the airflow, which reduces the boundary layer along the surface 400. Additionally or alternatively, one or more of the vortex generators 802 can be formed as recesses extending into the surface 400.

Examples of means for generating a vortex or vortexes along the surface 400 of the first wall 218 have been disclosed. In particular, any of the example patterns 404, 500, 600, 700, 800, the vortex generators 402, 502, 602, 702, 802, and/or other variations disclosed herein can be implemented as means for generating a vortex or vortexes. In some examples, as disclosed above, the means for generating a vortex or vortexes is/are formed on (e.g., machine into) the surface 400 of the first wall 218. However, in other examples, the means for a generating a vortex or vortexes can be formed on a separate component (e.g., a piece of sheet metal) that is coupled to the surface 400 of the first wall 218.

While the example vortex generators 402, 502, 602, 702, 802 and the example patterns 404, 500, 600, 700, 800 are disclosed in connection with the first wall 218, any of the example vortex generators 402, 502, 602, 702, 802 and/or the example patterns 404, 500, 600, 700, 800 can be similarly implemented on the second wall 220, in addition to or as an alternative to the first wall 218. The example vortex generators 402, 502, 602, 702, 802 and the example patterns 404, 500, 600, 700, 800 can similarly help improve flow along the second wall 220. In some examples, the first and second walls 218, 220 can include the same type of vortex generators and/or patterns of vortex generators. In other examples, the first and second walls 218, 220 may have different vortex generators and/or patterns of vortex generators. For example, the first wall 218 may include the pattern 500 and the second wall 220 may include the pattern 600.

Further, any of the example vortex generators 402, 502, 602, 702, 802 and/or the example patterns 404, 500, 600, 700, 800 can be similarly implemented on the first and/or second walls of the channel 224 (FIG. 2). In some examples, the channels 216, 224 can include the same type of vortex generators and/or patterns of vortex generators. In other examples, the channels 216, 224 may have different vortex generators and/or patterns of vortex generators. For example, the channel 216 may include the pattern 500 and the channel 224 may include the pattern 600.

Therefore, it can be appreciated that examples have been disclosed that improve airflow through the bleed channel or slot. The examples disclosed herein improve bleed pressure recovery and increase bleed air pressure in a bleed cavity. This improves back flow margin, such as HP turbine cooling supply back flow margin. This also improves the bleed slot discharge coefficient. The example vortex generators and/or patterns of vortex generators can be added (retrofitted) to compressors on existing gas turbine engines and/or can be added to newly manufacturing gas turbine engines.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Example apparatus, systems, and articles of manufacture to improve bleed airflow in a gas turbine engine are disclosed herein. Further examples and combinations thereof include the following:

Example 1 includes a gas turbine engine comprising: a compressor including a casing having an inner wall and an outer wall, the inner wall defining a passageway for airflow through the compressor, the casing defining a bleed cavity between the inner wall and the outer wall, the inner wall having an opening, the casing defining a channel between the opening and the bleed cavity to direct a portion of the airflow into the bleed cavity, the channel defined by a first wall and a second wall of the casing, the first wall being upstream of the second wall, a surface of the first wall being patterned with a pattern to reduce flow separation in the channel.

Example 2 includes the gas turbine engine of any preceding clause, wherein the pattern includes recesses extending into the surface of the first wall.

Example 3 includes the gas turbine engine of any preceding clause, wherein the recesses are spaced equidistant from each other.

Example 4 includes the gas turbine engine of any preceding clause, wherein the recesses are hemispherical-shaped recesses.

Example 5 includes the gas turbine engine of any preceding clause, wherein the recesses are slots spaced apart and parallel to each other.

Example 6 includes the gas turbine engine of any preceding clause, wherein the slots are angled relative to a radial direction of the gas turbine engine.

Example 7 includes the gas turbine engine of any preceding clause, wherein the pattern includes projecting ribs that are aligned in a circumferential direction of the gas turbine engine.

Example 8 includes the gas turbine engine of any preceding clause, wherein the pattern includes protrusions extending from the surface of the first wall.

Example 9 includes the gas turbine engine of any preceding clause, wherein the protrusions are airfoil-shaped protrusions.

Example 10 includes the gas turbine engine of any preceding clause, wherein the airfoil-shaped protrusions are arranged in a row a circumferential direction of the gas turbine engine.

Example 11 includes the gas turbine engine of any preceding clause, wherein the first wall includes a first casing portion and a second casing portion, and wherein the pattern is formed on the first casing portion and the second casing portion.

Example 12 includes the gas turbine engine of any preceding clause, wherein the first casing portion is a machined casing and the second casing portion is sheet metal.

Example 13 includes a gas turbine engine comprising: a casing of a compressor, the casing including: an outer wall; an inner wall defining a passageway for airflow through the compressor to a combustor of the gas turbine engine, a bleed cavity defined between the outer wall and the inner wall, the inner wall having an opening; and a first wall and a second wall defining a channel between the opening and the bleed cavity to direct a portion of the airflow into the bleed cavity; and vortex generators formed on a surface of the first wall, the vortex generators to cause a disturbance in the airflow to reduce flow separation along the first wall.

Example 14 includes the gas turbine engine of any preceding clause, wherein the vortex generators are recesses extending into the surface of the first wall.

Example 15 includes the gas turbine engine of any preceding clause, wherein the recesses are hemispherical-shaped recesses.

Example 16 includes the gas turbine engine of any preceding clause, wherein the recesses are slots spaced apart and parallel to each other.

Example 17 includes the gas turbine engine of any preceding clause, wherein the vortex generators are protrusions extending from the surface of the first wall.

Example 18 includes the gas turbine engine of any preceding clause, wherein the protrusions are airfoil-shaped protrusions.

Example 19 includes a gas turbine engine comprising: a casing of a compressor, the casing defining a passageway for airflow through the compressor to a combustor of the gas turbine engine, the casing having a first wall and a second wall defining a channel to extract a portion of the airflow as bleed air from the passageway, the second wall being downstream of the first wall; and means for generating a vortex along a surface of the first wall.

Example 20 includes the gas turbine engine of any preceding clause, wherein the means for generating a vortex is formed on the surface of the first wall.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

While this disclosure has been described as having exemplary designs, the present disclosure can be further modified within the scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A gas turbine engine comprising:
a compressor including a casing having an inner wall and an outer wall, the inner wall defining a passageway for airflow through the compressor, the casing defining a bleed cavity between the inner wall and the outer wall, the inner wall having an opening, the casing defining a channel between the opening and the bleed cavity to direct a portion of the airflow into the bleed cavity, the channel defined by a first wall and a second wall of the casing, the first wall being upstream of the second wall, the opening forming an inlet into the channel, a portion of the first wall adjacent the inlet being curved radially outward along an axial direction, a surface of the first wall being patterned with a pattern to reduce flow separation in the channel, the pattern extending along the portion of the first wall being curved, the pattern including recesses extending into the surface of the first wall.

2. The gas turbine engine of claim 1, wherein the recesses are spaced equidistant from each other.

3. The gas turbine engine of claim 1, wherein the recesses are hemispherical-shaped recesses.

4. The gas turbine engine of claim 1, wherein the recesses are slots spaced apart and parallel to each other.

5. The gas turbine engine of claim 4, wherein the slots are angled relative to a radial direction of the gas turbine engine.

6. The gas turbine engine of claim 4, wherein the pattern includes ribs formed between adjacent ones of the slots, the ribs being aligned in a circumferential direction of the gas turbine engine.

7. The gas turbine engine of claim 1, wherein the first wall includes a first casing portion and a second casing portion, and wherein the pattern is formed on the first casing portion and the second casing portion.

8. The gas turbine engine of claim 7, wherein the first casing portion is a machined casing and the second casing portion is sheet metal.

9. A gas turbine engine comprising:
a casing of a compressor, the casing including:
an outer wall;
an inner wall defining a passageway for airflow through the compressor to a combustor of the gas turbine engine, a bleed cavity defined between the outer wall and the inner wall, the inner wall having an opening; and
a first wall and a second wall defining a channel between the opening and the bleed cavity to direct a portion of the airflow into the bleed cavity; and
vortex generators formed on a surface of the first wall between a first location adjacent the opening and a second location adjacent the bleed cavity, the vortex generators to cause a disturbance in the airflow to reduce flow separation along the first wall.

10. The gas turbine engine of claim 9, wherein the vortex generators are recesses extending into the surface of the first wall.

11. The gas turbine engine of claim 10, wherein the recesses are hemispherical-shaped recesses.

12. The gas turbine engine of claim 10, wherein the recesses are slots spaced apart and parallel to each other.

13. The gas turbine engine of claim 9, wherein the vortex generators are protrusions extending from the surface of the first wall.

14. The gas turbine engine of claim 13, wherein the protrusions are airfoil-shaped protrusions.

15. A gas turbine engine comprising:
a casing of a compressor, the casing defining a passageway for airflow through the compressor to a combustor of the gas turbine engine, the casing having a first wall and a second wall defining a channel to extract a portion of the airflow as bleed air from the passageway, the second wall being downstream of the first wall, the first wall formed by a first casing portion and a second casing portion, the first casing portion being a machined or molded casing and the second casing portion being sheet metal, the second portion having ends extending into notches in the first casing portion; and means for generating a vortex along a surface of the first wall including the first casing portion and the second casing portion.

16. The gas turbine engine of claim 15, wherein the means for generating a vortex is formed on the surface of the first wall.

\* \* \* \* \*